3,414,553
POLYMERIZATION OF STYRENE
Roland J. Kern, Miamisburg, Ohio, assignor to Monsanto Company, a corporation of Delaware
Filed Mar. 31, 1955, Ser. No. 498,254
11 Claims. (Cl. 260—93.5)

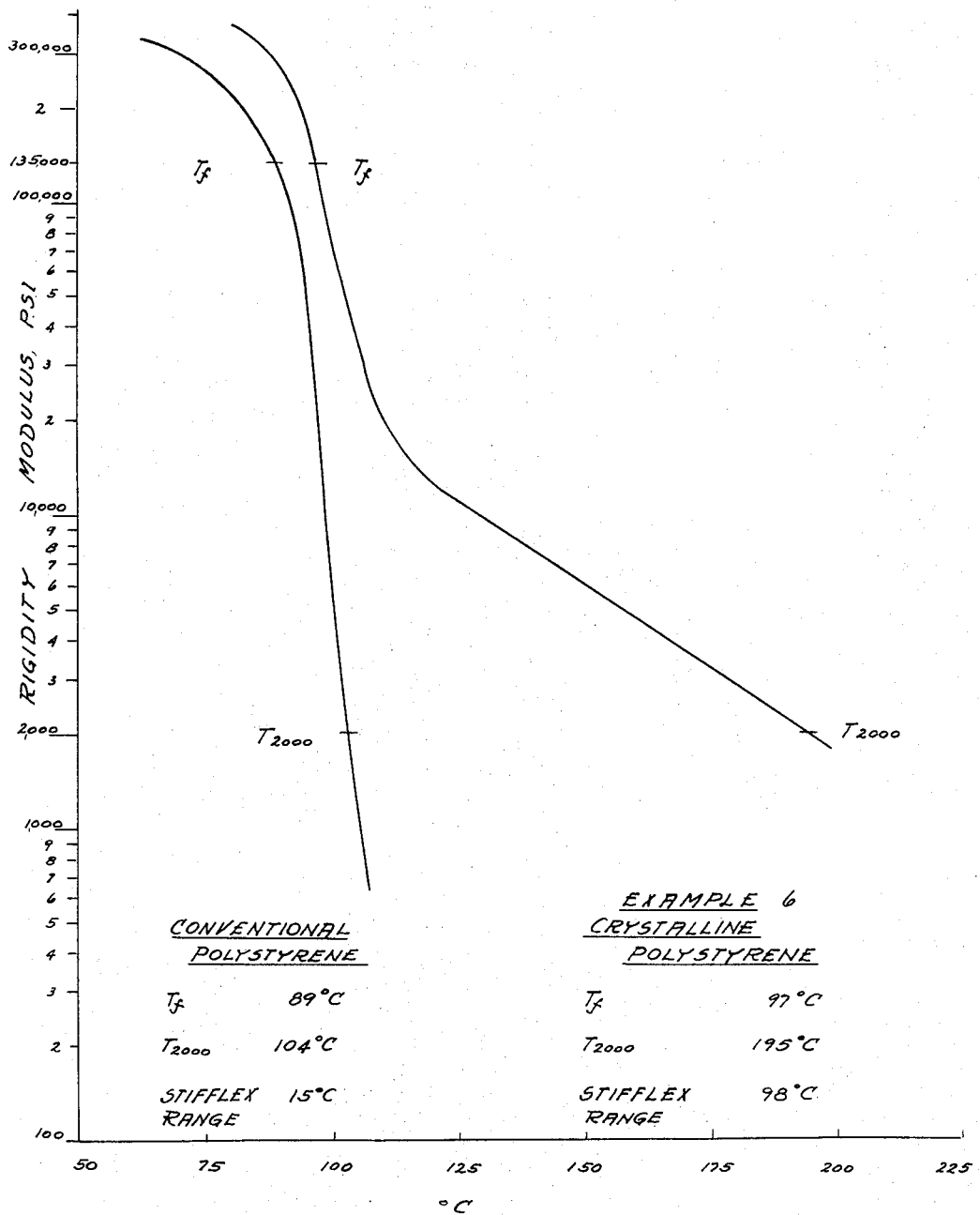

This invention relates to the polymerization of vinyl aromatic hydrocarbons. In some of its aspects the invention pertains to the polymerization of styrene to form crystalline polystyrene. In other aspects the invention provides a new type of polymeric material, i.e., high molecular weight polymers of vinyl aromatic hydrocarbons that show crystallinity by X-ray diffraction analysis. Yet other aspects of the invention provide improvements in the polymerization of styrene and allied vinyl aromatic hydrocarbons with catalysts exemplified by the material obtained by the interaction of a trialkylaluminum with titanium tetrachloride.

Polystyrene is one of the most important polymers of commerce, being widely used in a variety of applications, but especially in the form of molded objects. It is known to polymerize styrene in the absence of added catalysts, by free radical catalysis such as by peroxides and related compounds, and by polymerizations in solvents, in mass or bulk, and by emulsion and suspension techniques. The presently known polystyrene has certain defects, among the most important of which are a low softening temperature or heat distortion point, and a very limited transition range, i.e., it changes from a hard rigid solid to a soft material on up to an essentially melted material over a temperature range of a very few degrees centigrade.

The present invention is concerned with the polymerization of styrene and vinyl aromatic hydrocarbons generally, i.e., hydrocarbons containing a $CH_2=CH-$ group directly attached to an aromatic ring, e.g., vinyltoluene, vinylnaphthalene, vinylxylene, vinylmethylnaphthalene, vinylisopropylbenzene, and the like. In accordance with the invention there are produced polyvinyl aromatic hydrocarbons, e.g. polystyrene, having a crystalline nature as determined by X-ray diffraction analysis. Such polystyrene is fundamentally different from polystyrenes heretofore known, and is produced by polymerizing styrene in the presence of a catalyst prepared by the interaction of (a) an aluminum compound of the general formula $R_2AlX$ wherein R is an alkyl, cycloalkyl or aryl radical and X is hydrogen, halogen or an alkyl, cycloalkyl or aryl radical, with (b) a metal halide selected from the group consisting of the chlorides, bromides and iodides of titanium and zirconium. The practice of the various aspects of the invention will be described by way of example, with particular reference to catalysts prepared by the interaction of trialkylaluminums, e.g., triethylaluminum, triisobutylaluminum, trioctylaluminum, with titanium tetrachloride.

Some disadvantages encountered in the polymerization of styrene with catalysts of the nature mentioned in the preceding paragraph, are the low polymerization rate and low yield of polymer, particularly when coupled with the comparatively low ratio of high molecular weight acetone-insoluble crystalline polystyrene to less desired low molecular weight non-crystalline polystyrene. In accordance with preferred embodiments of the invention, these disadvantages are minimized by carrying out the polymerization at a temperature below 30° C., and/or by carrying out the polymerization in the absence of an added organic solvent or at least in the presence of less than 50 weight percent solvent based on the weight of the monomer. Each of these procedures, and the procedures in combinations with each other, improve the yield of total polymer, and increase the ratio of high molecular weight acetone-insoluble crystalline polystyrene to low molecular weight acetone-soluble non-crystalline polystyrene. As a further feature of the invention, trialkylaluminums containing long alkyl groups, e.g., those averaging at least 8 carbon atoms in each of the alkyl groups, are employed with a chloride or other halide of titanium or zirconium; the resultant total polymer is obtained in increased amounts and with a higher percentage of the high molecular weight crystalline polystyrene.

High molecular weight polystyrene produced by this invention shows crystallinity, and is highly resistant to the action of heat and the action of solvents. These important properties adapt it particularly for injection and compression molded articles, and for extrusion and other methods of forming into films, fibers, tubes and other shapes. It can of course be formulated with various pigments, dyes, fillers, other polymers and the like as may be desirable to impart particular desired characteristics. It can be drawn out into fibers where the crystallinity has a desirable strengthening effect. Likewise films can be oriented by unidirectional or bidirectional stretching thereby obtaining greatly increased strength. Similar properties are exhibited by other polyvinylaromatic hydrocarbons obtained by practice of the invention. The lower molecular weight non-crystalline polystyrene, e.g., that which is acetone-soluble, is useful as a film-former in lacquers and other surface coatings.

Suitable aluminum compounds to be reacted with the chlorides, bromides or iodides of titanium or zirconium are those represented by the general formula $R_2AlX$ wherein R is an alkyl, cycloalkyl or aryl radical and X is hydrogen, halogen, or an alkyl, cycloalkyl or aryl radical. By way of example, but not limitation, the following compounds are mentioned:

triethylaluminum
triisobutylaluminum
trioctylaluminum
didodecyloctylaluminum
diisobutylaluminum hydride
tridodecylaluminum
diphenylaluminum bromide
dipropylcyclohexylaluminum
ditolylmethylaluminum
tri-(β-phenylethyl)aluminum
diethylaluminum chloride
diisobutylaluminum chloride
diisobutylaluminum iodide
di(β-cyclohexylpropyl)isobutylaluminum It is to be understood that mixtures of the foregoing types of aluminum compounds can be employed. One can use the total reaction mixtures obtained in the formation of such compounds, e.g., by treatment of metallic aluminum with alkyl halides resulting in the formation of such mixtures as $R_2AlCl$ plus $RAlCl_2$, termed alkylaluminum sesquihalides.

The aluminum compounds in question are interacted with one or more chlorides, bromides or iodides of titanium or zirconium, the chlorides and iodides being preferred. The titanium or zirconium in these halides should be in a valence form higher than the lowest possible valence. The tetrahalides are especially preferred, although the dihalides, trihalides, mixtures of di-, tri- and tetrahalides, etc., can be used. Preferred titanium or zirconium compounds are those that are soluble in an organic solvent (preferably a hydrocarbon such as hexane, benzene, kerosene, etc.) that is used in preparing the catalyst. Titanium or zirconium compounds other than the named halides, e.g., those called alcoholates, alkoxides or esters by various investigators such as titanium tetramethoxide (also called tetramethyl titanate), titanium triethoxide, tripropoxytitanium chloride, zirconium tetra-n-butoxide, or fluorides of titanium or zirconium, or complexes such as zirconium acetylacetonate, $K_2TiF_6$, or salts of organic acids such as the acetates, benzoates, etc. of titanium and zirconium, can be used to prepare catalysts with at least some activity and to that extent can be considered equivalents of the halides; however, such compounds are usually prepared from the halides and hence are more costly, and also are usually less active, so their use is economically sound only where in a particular situation favorable effects can be obtained such as increased solubility in an organic solvent that is used in preparing the catalyst, or polymer of increased molecular weight, or faster reaction rate. Although the exact action resulting from contacting the aluminum compound with the titanium or zirconium compound is not understood, it is believed likely that the zirconium or titanium halide is reduced in valence by the reaction of the added aluminum compound. The mol ratio of aluminum compound to titanium (or zirconium) compound, or stated another and simpler way, the mol ratio of aluminum to titanium (or zirconium), can vary over a wide range, suitable values being from 0.3:1 to 10:1 on up to 15:1 or higher. It is generally preferred to use an Al:Ti mol ratio between 2.0:1 and 5:1. The same ratios apply in the case of the zirconium compounds. While active catalysts can be prepared by a variety of procedures, the simplest and perhaps most effective is to add the titanium or zirconium halide to the aluminum compound, preferably in the presence of comparatively small amounts of an inert organic solvent. Such solvents can suitably be saturated aliphatic and alicyclic, and aromatic, hydrocarbons, halogenated hydrocarbons, and saturated ethers. By way of example can be mentioned liquefied propane, isobutane, normal butane, n-hexane, the various isomeric hexanes, cyclohexane, methylcyclopentane, dimethylcyclohexane, dodecane, industrial solvents composed of saturated and/or aromatic hydrocarbons, such as kerosenes, naphthas, etc., especially when hydrogenated to remove any olefin compounds, and especially those ranging in boiling point up to 600° F. Also, benzene, toluene, ethylbenzene (very convenient in the case of styrene as the separation of styrene from ethylbenzene used as a starting material for the production of styrene is unnecessary), cumene, decalin, ethylene dichloride, chlorobenzene, diethyl ether, o-dichlorobenzene, dibutyl ether, tetrahydrofurane, dioxane.

It may also be mentioned here that the polymerization can readily be effected in the presence of any of the classes of solvents and specific solvents just named. However, I have discovered that if the proportion of such solvent is kept low in the reaction mixture, superior results are obtained. Thus, I prefer to operate in the presence of from 0 to 50 weight percent inert organic solvent (i.e., inert to the reactants and catalysts under the conditions employed) based on the weight of vinyl aromatic hydrocarbon monomer employed.

The amount of catalyst required is comparatively small. Amounts as small as 0.01 weight percent based on total weight of monomer charged are sometimes permissible, although it is usually desirable to use in the neighborhood of 0.1 to 2.0 percent. Larger amounts up to say 5 percent or higher, are satisfactory, but are seldom necessary.

The styrene or other vinyl unsaturated hydrocarbon monomer or mixture of one or more vinyl aromatic hydrocarbon monomers is contacted with the catalyst in any convenient manner, preferably merely by bringing the catalyst and liquid monomer together with intimate agitation provided by suitable stirring or other means. The agitation can be continued during the polymerization, or the polymerization mixture can be allowed to remain quiescent while the polymerization takes place. In the case of the more rapid reactions with the more active catalysts, means can be provided for refluxing monomer and solvent, if any of the latter is present, and thus removing the heat of reaction. If desired, the styrene or other monomer can be brought in the vapor phase into contact with the solid catalyst, in the presence or absence of liquid solvent.

The catalyst is sensitive to various poisons among which may be mentioned oxygen, water, carbon dioxide, carbon monoxide, and acetylenic compounds. For this reason, suitable precaution should be taken to protect the catalyst and the reaction mixture from such materials. An excess of the aluminum compound, particularly mol ratios of aluminum to titanium or zirconium in excess of about 4:1, tend to give a certain amount of protection against these poisons.

While the polymerization can be effected over a wide range of temperatures, such as from the boiling point of the vinyl aromatic hydrocarbon monomer at atmospheric or superatmospheric pressure down to say minus 40° C. and even lower, I have found that much improved results are obtained if the temperature is maintained below 30° C. This results in a higher yield of total polymer with a given quantity of catalyst, and of particular interest results in a higher proportion of the desired high molecular weight crystalline polystyrene in the total polymer.

The reaction is suitably carried out at atmospheric pressure or higher. Although sub-atmospheric pressures are permissible, there would seldom be any advantage. Pressures ranging from atmospheric up to several hundred or even many thousand pounds per square inch, e.g., 50,000 p.s.i. and higher, are suitable. While it is not necessary to use the higher pressures in order to obtain reaction, they will have a desirable effect on reaction rate and in some instances on polymer quality. The choice of whether or not to use an appreciably elevated pressure will be one of economic and practical considerations, taking into account the advantages that can be gained thereby.

In the specific examples given hereinafter, various methods of working up the total reaction mixture to obtain the desired polymers will be noted. Generally speaking, the higher molecular weight polystyrene showing crystallinity by X-ray diffraction analysis is the preferred product. This is in most instances insoluble in a variety of solvents. Acetone is an inexpensive and convenient solvent to use in working up the polymers and in separating the lower molecular weight acetone-soluble material from the higher molecular weight acetone-insoluble product which is the more desired for most purposes. Ordinarily the reaction mixture can be treated one or more times with acetone and the acetone-insoluble polymer separated by decantation of the acetone liquors and/or filtration. This is followed, or in some cases preceded, by washing with hydrochloric acid in a suitable organic solvent, methanolic HCl being quite effective. This is for the purpose of removing catalyst residues. The amount of washing with acetone and methanolic HCl will be dependent upon the particular circumstances. In any event, it will be desirable to finish the washing with a solvent, such as methanol, free from acid. The insoluble polymers are finally dried. The acetone-soluble polymers are generally insoluble in hydroxylated solvents such as methanol, and can be readily precipitated from their solution in acetone by introduction of methanol, water or the like. The thus recovered polymers can then be separated from the liquids and dried. Many other procedures and materials can be used to work up the products, and all such can be employed without departing from the invention.

The following specific examples are given by way of illustration of different catalyst combinations, conditions for catalyst preparation, polymerization conditions and methods of working up the products. It will be understood, however, that variations from the exact details given can be made without departing from the invention.

The catalyst preparations and polymerizations of the following examples were effected in a reactor which was a vertically elongated glass tube with a curved bottom. It was stirred by means of a short bar of iron sealed in a glass envelope and free to move in the bottom of the reactor and a magnetic stirring device provided immediately under the reactor which caused the stirring bar to undergo rapid rotation in the reaction mixture. Means were provided for flushing the reactor with nitrogen gas prior to introduction of reagents and during the polymerizations when desired. Materials were introduced into the reactor from a dropping funnel attached thereto. Most reactions were started at room temperature and run at the temperature attained by virtue of the liberated heat of polymerization, seldom over 30° C. In some cases the reactor was heated by an electrical resistance mantle around it.

Example 1

Into the reactor was placed 0.35 gram titanium tetrachloride ($TiCl_4$) and 10 cc. reagent grade (thiophene-free) benzene. While the material was stirred, there was added under the protection of lamp grade nitrogen, 0.5 gram of triethyl-aluminum (TEA) in 5 cc. hexane. Then 20 cc. of styrene monomer was added. After the components had become well mixed, the reactor was sealed off and allowed to stand overnight. The next day when examined, the reactor contained a dark brown opaque jelly. A small sample covered with 100 times its volume of toluene and heated several hours at 90° C. appeared to swell somewhat but was still insoluble. The total reaction product, with the exception of the small sample just mentioned, was covered with acetone, which extracted much of the color. The acetone liquors were poured off into methanol resulting in the formation of a white flocculent precipitate. This acetone-soluble, methanol-insoluble solid material was of comparatively low molecular weight, and molded to a clear, very brittle crisp specimen.

The original solids were extracted twice more with acetone. The remaining material insoluble in acetone was then steeped in hot methanol to remove more color, filtered and dried. The resulting material was a light tan in color compared to the very dark original color, did not become completely fused when molded at 165° C., but molded satisfactorily at 200° C.

The X-ray diffraction pattern of ordinary polystyrene gives a smooth curve. However, when the X-ray diffraction was obtained on the molded film of the acetone-insoluble polymer of the present example, it was found that the pattern contained several rather sharp maxima of sufficient intensity to establish the presence of considerable crystalline material in the sample.

Example 2

The catalyst was prepared by adding 1 gram triethyl-aluminum in 10 cc. hexane to 0.8 gram $TiCl_4$ in 10 cc. benzene in the stirred, nitrogen-purged reactor. This gave a mol ratio of aluminum to titanium of 2.0. Redistilled styrene was then added in the amount of 25 cc. The mixture was stirred at room temperature for three days.

Methanolic hydrogen chloride (1 cc. concentrated aqueous HCl in 100 cc. methanol) was added to the reaction mixture, which had the appearance of a gel-like mass in a dark liquid medium, and then decanted. This treatment with methanolic HCl was repeated with decantation until no further color was extracted, leaving a white solid polymer.

This polymer was steeped in warm acetone, filtered, and the filtered solids washed with methanol. On mixing methanol with the acetone filtrate a white milky suspension was obtained.

The acetone-insoluble polymer, recovered in the amount of 1.6 grams, was molded. At 165° C. and at 200° C. it was incompletely fused, but at 250° C. it flowed well.

The X-ray diffraction pattern contained about ten rather sharp diffraction maxima. These are indicative of crystalline material and were intense enough to indicate the presence of more than just trace amounts of crystalline matter. The diffraction maxima were sharper than those obtained with the polystyrene product of Example 1, and approached the sharpness of microscopic crystals. This means that the crystalline regions were of the order of 1,000 Angstroms or greater in size.

Examination with the petrographic microscope (polarized light) revealed the sample to consist of birefringent fiber-like material (with parallel extinction) embedded in an optically isotropic medium. Since crystalline polymers are necessarily optically anisotropic, it follows that the crystalline matter in this sample was contained in the matted fiber-like material. The parallel extinction of the fibers probably indicates that the polymer molecules are aligned parallel to the fiber axis.

On combustion of this polystyrene, no weighable ash was found.

Example 3

A different apparatus was used in obtaining the results of this example. The apparatus was a round-bottom flask provided with mechanical stirrer, a reflux condenser, a dropping funnel and means for nitrogen purging. First introduced into the flask was 2.5 gram $TiCl_4$ in 135 cc. xylene. To this was added 3.0 gram triethylaluminum in 10 cc. hexane with vigorous stirring. Some gas evolution was noted. The mol ratio of aluminum to titanium was 2.0. Redistilled styrene in the amount of 100 cc. was then added, followed by 10 cc. hexane. The flask was heated with a mantle so that the reaction mixture was maintained at 50–60° C., and stirring continued at this temperature overnight (13 hours).

The dark brown viscous syrup resulting was poured into methanol, the methanol liquors decanted and discarded, and the resulting sticky gummy solids washed again with methanol. The solids were then covered with acetone, which dissolved most of the mass. The amount of acetone-insoluble polymer recovered was small, about 0.3 gram. The acetone-soluble polymer was precipitated in methanol and filtered, washed with methanol and dried. This amounted to 26 grams. It was low molecular weight polystyrene, which melted partially at a comparatively low temperature (room heating steam radiator) to a discolored crisp brittle solid.

The very high proportion of acetone-soluble polymer in comparison to the extremely small yield of acetone-insoluble polymer indicated that the higher temperature was undesirable.

Example 4

This was similar to Example 3, in the same apparatus, charging 75 cc. of styrene, and about half the quantities of hexane and xylene used in Example 3. The test was run at room temperature, as compared to the 50–60° C. of Example 3. The reaction mixture after being thoroughly mixed by mechanical stirring was allowed to stand without agitation, for three and a half days.

The reaction mixture was worked up with acetone and methanol, resulting in the recovery of 0.6 gram of acetone-insoluble fibrous white polymer. An additional quantity of 0.2 gram of material which was acetone- and methanol-insoluble, was recovered from the decanted acetone liquors. This additional solid material was discarded.

The final acetone liquors were evaporated to reduce their volume, then precipitated in methanol. The recovered acetone-soluble solids amounted to 11 grams.

Acetone-insoluble solid (0.6 gram) was molded at 175° C. to give a hazy, brittle film incompletely fused at the edges. This polymer requires a temperature well above 175° C. for satisfactory molding. The acetone-soluble solid molded at 170° C. was quite clear, indicating the absence of crystalline material, but was of very low strength.

This example, in comparison with the preceding Example 3 run at higher temperatures, gave a much higher ratio of acetone-insoluble crystalline solids to acetone-soluble product.

Example 5

The apparatus described above before Example 1 was used for this test. The catalyst (2.0 mol ratio Al/Ti) made up by reacting 0.84 gram TiCl$_4$ with 1.0 gram triethylaluminum in 15 cc. hexane, was spread on the walls of the reactor by tipping the reactor through which nitrogen was flowing so that catalyst covered all of the walls of the reaction vessel. Some of the catalyst drained back off the walls when the reactor was righted. Then lamp grade nitrogen was blown through styrene monomer held at 50–60° C. and then led through the reactor for about 4 hours. Thus, the styrene vapor contacted solid catalyst on the walls of the reactor in the essential absence of solvent. More styrene was polymerized on the tube walls than in the liquid in the bottom, which contained some condensed styrene monomer.

The total contents of the reactor was worked up with acetone, resulting in the recovery of 0.5 gram acetone-insoluble polystyrene which when molded at 175° C. gave a film which was hazy, but clearer in some areas than others.

Example 6

This involves two runs made simultaneously under the same conditions. In the first, which will be termed Run 6-A, 80 cc. styrene and 66 cc. hexane was charged. In the second, which will be termed Run 6-B, 50 cc. styrene and 31 cc. hexane was charged. In each instance, the catalyst was made up from 0.84 gram TiCl$_4$ and 1.2 grams triethylaluminum. Part of the hexane in each case was charged in preparing the catalyst and the remaining with the styrene. After the catalyst had been prepared and the styrene and remaining hexane charged to each flask, the flasks were swirled to obtain a thorough admixture of the materials therein, then stoppered and placed in a refrigerator where they were maintained side by side at the temperature of −7° C. for a one-week period.

The reaction mixture of Run 6-A was worked up in the following manner. It consisted of two layers, the top a relatively clear viscous tan color, the bottom a very dark brown gel-like material. The upper layer was poured into acetone resulting in formation of a flocculent cream-colored precipitate. This precipitate was recovered, washed with acetone and dried. It weighed 1.0 gram. The lower layer was swamped in acetone, the acetone insolubles product recovered and successively washed in acetone, isobutanol, and methanolic HCl until white. On drying it weighed 0.5 gram. Thus, the total recovery of acetone insolubles was 1.5 grams. The acetone liquors were precipitated in methanol, filtered, washed in methanol, filtered again and dried, resulting in the recovery of 2.2 grams of acetone-soluble polymer. The polymers recovered from Run 6-A were not further tested.

The reaction mixture from Run 6-B was similarly worked up (resulting in the recovery of 1.9 grams acetone-insoluble polymer and 11.0 grams acetone-soluble polymer.

A comparison of Run A with Run B shows that the one containing a smaller proportion of the hexane solvent (Run B) gave much greater yield of both acetone-soluble and acetone-insoluble polymers than did Run A, although the proportion of acetone-insolubles to acetone-solubles was lower.

The acetone-insoluble polymer obtained from Run 6-B was subjected to a series of solubility tests. In each of the following liquids in which ordinary polystyrene is readily soluble at room temperature, this polymer was found to be insoluble at room temperature: dioxane, ethyl acetate, dimethylformamide, ethylene dichloride, methyl ethyl ketone, xylene, benzene, tetrahydrofuran. The very high solvent resistance of this polymer was shown by the fact that no solvent was found which would dissolve it at room temperature. Portions of this polymer that had been molded were broken into small pieces and heated in refluxing xylene for one hour. The cool mixture was filtered through a cloth, leaving much clear gel on the cloth. The filtrate was precipitated in acetone and the white precipitated solid dried. When molded at 180° C. a translucent, brittle incompletely fused film resulted. The clear gel that had been filtered out was then introduced into chlorobenzene and refluxed for 3 hours, resulting in a clear solution containing no gel. The fact that the material could be dissolved by heating in chlorobenzene to the relative high temperature of its boiling point (130° C.) indicates the essential lack of cross-linked material. The resulting solution was precipitated in methanol, the solids recovered, dried and molded at 240° C. This resulted in the formation of a translucent, completely fused film (thickness 0.005 inch). X-ray diffraction analysis of this film gave evidence of about 25 percent crystalline material, the pattern being similar to that described in Example 2 but the peaks were more sharp and definite. The infrared spectrum of this film showed strong mono-substituted aromatic bands, no indication of para-substituted aromatic structures, and any ortho-substitution unknown because the strong mono-substitution bands interfered; a minor band at 12.9$\mu$ suggested the presence of meta-disubstituted rings. Samples of unmolded acetone-insoluble polystyrene from other examples when refluxed in chlorobenzene dissolved completely, but when molded first and then refluxed in chlorobenzene some dissolved while some gel remained.

The acetone-insoluble polymer from Run B was also subjected to the Clash-Berg modulus test. This is a measure of the stiffness of a plastic specimen as a function of temperature, measured by means of a torsional test. The test is essentially that described by Clash and Berg in Industrial Engineering Chemistry 34, 1218 (1942). The brittle temperature ($T_f$) is the temperature at which the stiffness modulus is 135,000 p.s.i. The rubber temperature ($T_{2000}$) is the temperature at which the stiffness modulus is 2000 p.s.i. The Stifflex range is $T_{2000}$ minus $T_f$, and is a measure of what can be called the transition range of the polymer.

The attached figure shows the Clash-Berg curve for this polymer, and for comparative purposes also shows the Clash-Berg curve for a conventional commercial polystyrene prepared by mass polymerization. A comparison of the curves immediately shows two striking differences in the materials. The first is the considerably higher $T_f$ of the polystyrene described in this example, this value being 97° C. as compared to 89° C. for the commercial polystyrene. The second is that whereas the curve for the commercial polystyrene continues a steep descent resulting in a $T_{2000}$ (104° C.) only 15° C. higher than the $T_f$, i.e., the Stifflex range is 15° C., the modulus curve for the product of this example undergoes only a gradual descent so that the $T_{2000}$ (195° C.) is almost 100° C. above the $T_f$, i.e., the Stifflex range is 98° C. Thus, this polymer not only requires a considerably higher temperature before it begins to lose its rigidity, but further has a very broad transition range—obviously a great advantage for a large number of applications and uses.

Example 7

In this example the catalyst was made up by introducing 0.25 gram TiCl$_4$ in 10 cc. hexane into the reactor, followed by 1.92 grams of trioctylaluminum in 10 cc. hexane. After standing for half an hour, 40 cc. styrene was added and the mixture allowed to stand at room temperature in a closed system.

After standing overnight (17 hours) at room temperature, the reaction mixture was jelly-like and slimy. 100 cc. of acetone was added. Acetone, isobutyl alcohol and methanolic HCl were used in successive runs to wash out colored materials.

The precipitation of acetone liquors in methanol followed by recovery and drying of the acetone solubles, resulted in the recovery of 1.4 grams solids. The acetone- and methanol-insoluble solids, when washed and dried, amounted to 0.8 gram.

It will be noted, in comparing this example with earlier examples in which triethylaluminum and triisobutylaluminum were used, that the use of trioctylaluminum resulted in a higher yield of acetone-insoluble polystyrene and a lower yield of acetone-soluble polystyrene.

Example 8

This example was carried out in the general manner described in the other examples, the catalyst being prepared by adding 1.8 grams of tristyrylaluminum (i.e., tri-(β-phenylethyl)-aluminum) in 10 cc. hexane to 0.25 gram $TiCl_4$ in 10 cc. hexane. The mixture turned red-brown and slowly blackened, but the final color was not as dark as that of the catalysts in the earlier examples. After one-half hour, 40 cc. styrene was added. After standing overnight at room temperature, the reaction mixture was diluted with acetone. A greenish flocculent precipitate settled out. The precipitate was filtered off and found to be soluble in HCl. The latter, and the original filtrate were precipitated in methanolic HCl. The recovered low molecular weight styrene polymer weighed 1.6 gram. The quantity of acetone-insoluble polymer was quite small.

While this invention has been described with particular reference to preferred embodiments thereof, it will be appreciated that variations from the details given herein can be effected without departing from the invention in its broadest aspects.

I claim:

1. A process for making crystalline polystyrene which comprises polymerizing styrene in the substantial absence of a solvent, at a temperature within the range of from −40° C. to the boiling point of styrene, and in admixture with a catalyst prepared by the interaction of a trialkyl-aluminum, wherein each alkyl radical has from 2 to 12 carbon atoms, with titanium tetrachloride, the mole ratio of aluminum to titanium being within the range of from 0.3:1 to 10:1 and the amount of said catalyst being within the range of from 0.1 to 5 weight percent based on the weight of styrene.

2. A process for making crystalline polystyrene which comprises polymerizing styrene in admixture with a catalyst prepared by the interaction of trioctylaluminum with titanium tetrachloride, wherein the mole ratio of aluminum to titanium is within the range of from 2.0:1 to 5:1, and the amount of said catalyst being within the range of from 0.1 to 2.0 weight percent based on the weight of styrene.

3. A process for the polymerization of a vinyl aromatic hydrocarbon monomer containing a single $CH_2=CH-$ group comprising contacting said monomer with a catalyst prepared by the interaction of (a) a trialkylaluminum, wherein each alkyl radical has from 2 to 12 carbon atoms, with (b) a titanium halide selected from the group consisting of the chlorides, bromides and iodides, wherein the mole ratio of (a) to (b) is within the range of from 0.3:1 to 10:1, and the amount of said catalyst being within the range of from 0.1 to 5 weight percent based on the weight of said monomer.

4. A process for the preparation of crystalline polystyrene which comprises polymerizing styrene in admixture with a catalyst prepared by the interaction of (a) a trialkylaluminum, wherein each alkyl radical has from 2 to 12 carbon atoms, with (b) a titanium halide selected from the group consisting of the chlorides, bromides and iodides, wherein the mole ratio of (a) to (b) is within the range of from 0.3:1 to 10:1, and the amount of said catalyst being within the range of from 0.1 to 5 weight percent based on the weight of said styrene, and separating noncrystalline acetone-soluble polymer from crystalline acetone-insoluble polymer.

5. The process of claim 4 wherein the catalyst comprises the material obtained by the interaction of triethylaluminum and titanium tetrachloride.

6. A process for the preparation of crystalline polystyrene which comprises polymerizing styrene in admixture with a catalyst prepared by the interaction of triethylaluminum and titanium tetrachloride wherein the mole ratio of aluminum to titanium is within the range 2.0:1 to 5:1, and the amount of said catalyst being within the range of from 0.1 to 2.0 weight percent based on the weight of styrene, and separating noncrystalline acetone-soluble polymer from crystalline acetone-insoluble polymer.

7. A process for the preparation of crystalline polystyrene which comprises adding styrene to a catalytic amount of a catalyst prepared by the interaction of (a) a trialkyl aluminum, wherein each alkyl radical has at least 2 carbon atoms, with (b) titanium tetrachloride, wherein the mole ratio of (a) to (b) is within the range of from 4:1 to 5:1, and then polymerizing said styrene.

8. A process for the preparation of crystalline polystyrene which comprises adding styrene to benzene, said benzene being present in an amount of about 50% by weight based on said styrene and containing a catalytic amount of a catalyst prepared by the interaction of (a) a trialkyl aluminum, wherein each alkyl radical has at least 2 carbon atoms, with (b) titanium tetrachloride, wherein the mole ratio of (a) to (b) is within the range of from 3:1 to 5:1, and then polymerizing said styrene in solution in said benzene.

9. A process for the preparation of crystalline polystyrene which comprises adding styrene to a catalytic amount of a catalyst prepared by the interaction of (a) a trialkyl aluminum wherein each alkyl radical has at least 2 carbon atoms with (b) titanium tetrachloride, and then polymerizing said styrene.

10. A process for the polymerization of an aryl vinyl monomer selected from the group consisting of ring substituted styrenes and vinyl napthalenes, said ring substituents being selected from the group consisting of halogen and methyl, comprising mixing said monomer with a diluent selected from the group consisting of benzene and cyclohexane, and a catalytic amount of a catalyst prepared by the interaction of (a) a trialkyl aluminum, with (b) a transition metal halide, and polymerizing said monomer.

11. A process for the polymerization of an aryl vinyl monomer selected from the group consisting of ring substituted styrenes and vinyl naphthalenes comprising mixing said monomer with a diluent selected from the group consisting of benzene and cyclohexane, and a catalytic amount of a catalyst prepared by the interaction of (a) a trialkyl aluminum, with (b) a transition metal halide, and polymerizing said monomer.

References Cited

UNITED STATES PATENTS

| | | | |
|---|---|---|---|
| 2,721,189 | 10/1955 | Anderson et al. | 260—93.1 |
| 2,440,498 | 4/1948 | Young et al. | 260—683.15 |
| 2,699,457 | 1/1955 | Ziegler et al. | 260—94.9 |
| 2,822,357 | 2/1958 | Brebner et al. | |
| 2,839,518 | 6/1958 | Brebner. | |
| 2,879,263 | 3/1959 | Anderson et al. | |
| 2,905,645 | 9/1959 | Anderson et al. | |

OTHER REFERENCES

Natta et al., J. Am. Chem. Soc., 77, 1707–1710, Mar. 20, 1955 (received Dec. 10, 1954).

Natta et al., Atti Acad. Nazl. Lincei Rend. Classe Sci. Fis. Mat. Nat., vol. 18, pp. 19–27, January 1955.

Herman et al., J.A.C.S., vol. 75, pp. 3877–3882 (1953).

JOSEPH L. SCHOFER, *Primary Examiner.*